Nov. 3, 1970     E. DICKS ET AL     3,538,294
WELDING DEVICE
Original Filed May 2, 1966
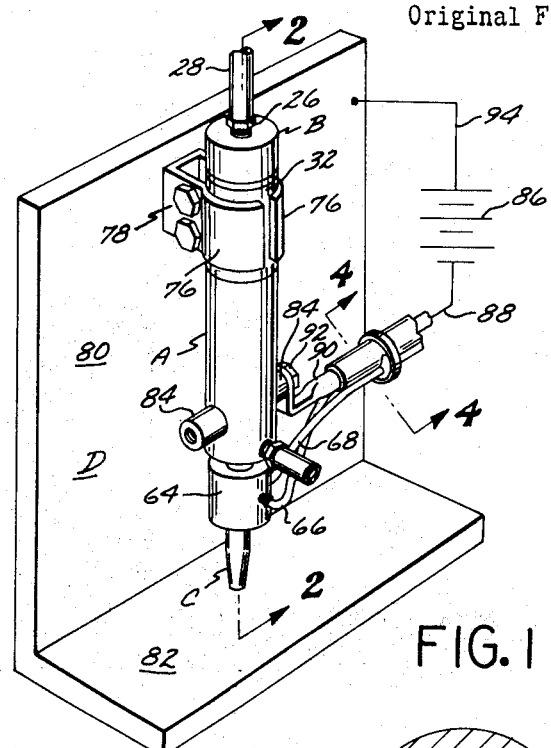
FIG. 1
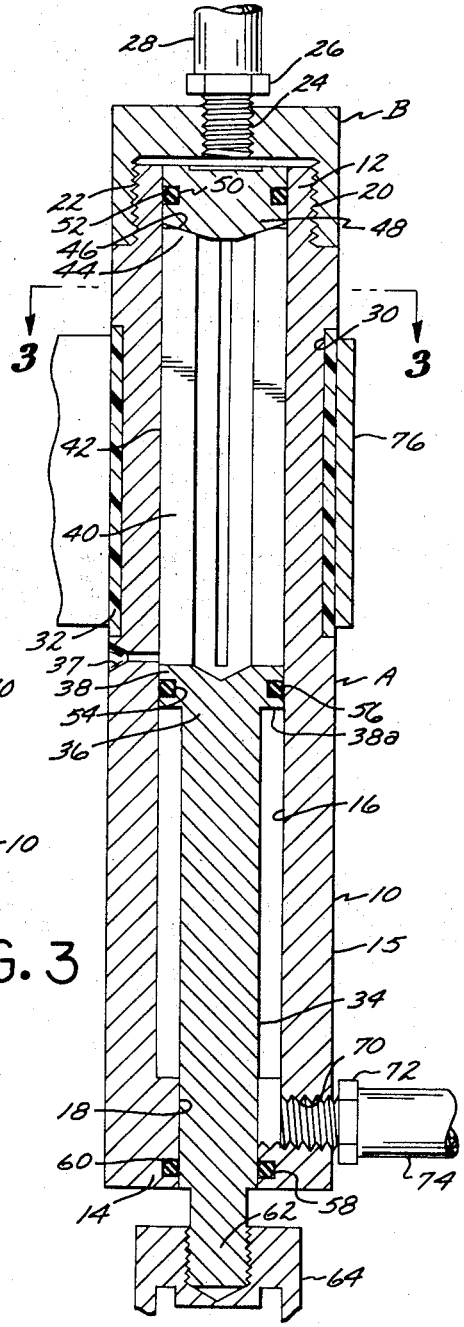
FIG. 2
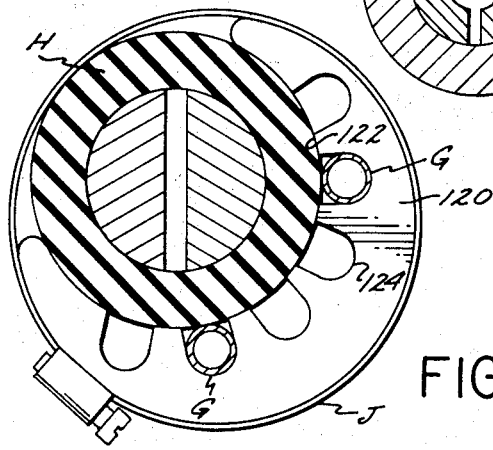
FIG. 3
FIG. 4
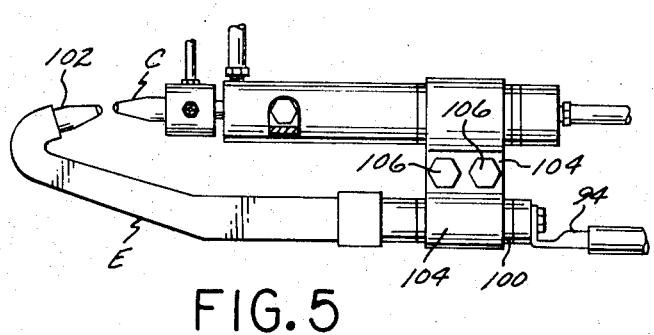
FIG. 5
INVENTORS.
EDWARD DICKS
WILLIAM C. BABCOCK
BY
William Q. Babcock
ATTORNEY

3,538,294
WELDING DEVICE

Edward Dicks, % Atty. B. D. Ward, 204 Park, Long Beach, Calif. 90803, and William C. Babcock, 2732 Walker Lee Drive, Los Alamitos, Calif. 90720
Continuation of application Ser. No. 546,738, May 2, 1966. This application Nov. 12, 1968, Ser. No. 775,588
Int. Cl. B23k 11/02
U.S. Cl. 219—89                                    1 Claim

ABSTRACT OF THE DISCLOSURE

A welding device in which a metallic first electrode supporting member is slidably mounted for longitudinal movement in a cylindrical housing, with the member being at all times in pressure contact with the housing, and with the magnitude of the pressure contact increasing after the member has moved to dispose the first electrode in engagement with a workpiece that is also in engagement with a second electrode which is fixedly spaced relative to the housing. During a welding cycle electrical current is continuously supplied to said housing and second electrode. Due to the increased pressure contact during the welding cycle the internal electrical resistance of the device is held at a minimum, and a minimum heating of the device occurs as a result thereof.

---

This application is a continuation of application Ser. No. 546,738, filed May 2, 1966, now abandoned.

A major object of the present invention is to provide a welding device which does not require the use of a heavy woven copper cable to carry electric current to the movable electrode, and one that can be assembled to provide either a horizontally movable spot welder, or a welding device of the pedestal type.

Another object of the invention is to supply a welding device that may be actuated by a fluid, is structurally simple, can be fabricated from standard, commercially available materials. requires a minimum of maintenance attention, and can be retailed at a sufficiently low price as to encourage the widespread use thereof.

Still another object of the invention is to furnish means by which existing spot welders can be modified whereby it is possible to dispense with the heavy woven cable used to supply electric current to the movable electrode thereof, which modified spot welders operate with increased efficiency.

Yet another object of the invention is to provide a device for removably supporting conduits and like elongate members used in conjunction with a spot welder in circumferentially spaced relationship on the exterior surface of a heavy cable.

These and other objects of the invention will become apparent from the following description thereof, and from the accompanying drawing illustrating the same, in which:

FIG. 1 is a perspective view of a first form of the device;

FIG. 2 is a longitudinal cross-sectional view of the device shown in FIG. 1, taken on the line 2—2 thereof;

FIG. 3 is a transverse cross-sectional view of the device, taken on the line 3—3 of FIG. 3;

FIG. 4 is a side elevational view of a device for removably holding a plurality of circumferentially spaced conduits in longitudinally extending positions on the exterior surface of a heavy cable; and FIG. 5 is a side elevational view of the device arranged to provide a horizontally movable spot welder.

With continued reference to the drawing for the general arrangement of the invention, it will be seen in FIG. 1 to include a metallic housing assembly A. Assembly A comprises an elongate body 10 having a first open end 12, a closed second end 14, and a cylindrical side wall 15. A bore 16 extends longitudinally through the body 10 and is in coaxial alignment with an opening 18 formed in the second end 14, all as may be seen in FIG. 2. Threads 20 are formed on the exterior surface of first end 12 that are engaged by threads 22 defined on the interior surface of a cap B.

A tapped fluid passage 24 is formed in cap B which is engaged by a conventional fitting 26 connected to a conduit 28 extending to a source (not shown) of fluid under pressure. A circumferentially extending recess 30 is formed in the external surface of body 10 wherein a layer of electrical insulating material 32 is disposed for reasons to be later explained. A metallic rod 34 is slidably positioned in opening 18, and extends into the bore 16, as best shown in FIG. 2.

The first end 36 of rod 34 develops into a first piston 38 that is in sliding and sealing engagement with the surface of body 10 in which bore 16 is formed. A number of circumferentially spaced, longitudinally extending fingers 40 project from the first piston 38 towards the cap B, with at least a part of the longitudinal exterior edges 42 of the fingers being in slidable pressure contact with the surface portion of the body 10 that defines the bore 16. Such pressure contact is effected by so forming the fingers 40 that spacing is provided between diametrically opposed edges 42 thereof which is greater than the diameter of the bore 16. The upper edges 44 of the fingers 40 taper inwardly towards one another and are slidably engaged by the lower tapered face 46 of a second piston 48, as can best be seen in FIG. 2.

A circumferentially extending recess 50 is formed in second piston 48 in which a resilient sealing ring 52 is disposed that is at all times in sealing engagement with the interior surface of body 10 in which bore 16 is formed. A circumferentially extending recess 54 is also formed in the first piston 38 in which a resilient sealing ring 56 is seated that sealingly engages that surface of body 10 in which the bore 16 is formed.

In addition, a circumferentially extending recess 58 is formed in the second end portion 14 in which a resilient sealing ring 60 is positioned that is at all times in sealing engagement with the exterior surface of the rod 34. Rod 34, first piston 38, and the fingers 40 are all formed from a metallic material, preferably copper or bronze, which have good electrical conducting properties. The lower end of rod 34 develops into a threaded portion 62 that engages a hollow metallic body 64 which is cooled by water circulated through two conduits 66 and 68, as can best be seen in FIG. 1. Body 64 supports an electrode tip C that is longitudinally movable relative to body 10. A tapped fluid passage 70 is formed in the second end portion of body 10, and is engaged by a conventional fitting 72 that is in turn connected to a second conduit 74 leading to a source of fluid under pressure. Passage 70 (FIG. 2) communicates with bore 16.

When the welding device is disposed in the first form thereof shown in FIG. 1, the electrical insulation 32 is gripped by two laterally spaced legs 76 forming a part of a first clamp 78, which is secured by conventional means (not shown) to a metallic upright 80 that is secured to a metallic base 82. The upright 80 and base 82 cooperatively provide a second electrode D.

Body 10 is provided with at least one tapped metallic boss 84 which projects outwardly therefrom. An electric circuit is also provided that includes a source of electric power 86 and an insulated conductor 88 extending therefrom having a terminal 90 on the fill end thereof. A bolt 92 extends through terminal 90, and when engaging the tapped boss 84 and tightened, the bolt 92 holds the terminal 90 in pressure metal-to-metal contact with the outer surface of the boss. A source of electric power 86 is connected by an electrical conductor 94 to upright 80.

When fluid under pressure is discharged through conduit 28, it moves the second piston 48 downwardly, as shown in FIG. 2, against the friction offered by the first piston 38 and sealing ring 56. As the piston moves downwardly in bore 16 the lower tapered surface 46 of the second piston 48 tends to force the fingers 40 away from one another, but this movement is restricted due to contact of the fingers with the surface of body 10 in which the bore 16 is formed. It will be apparent that the greater the force opposing the downward movement of second piston 48 in body 10, the greater will be the force urging the fingers 40 into slidable pressure contact with the surface of bore 16.

When the movable electrode C contacts a number of adjacent metallic workpieces (not shown) resting on base 82, the workpieces will be compressed and spot welded together due to the flow of electric power therethrough from the electrode C to electrode D. Upon completion of the spot welding work, the pressure on the fluid above second piston 48 is released, and air or other suitable fluid under pressure is discharged into bore 16 below first piston 38 through bore 70 and conduit 74. Air or other fluid so admitted to the lower portion of bore 16 acts on the lower surface 38a and moves rod 34 upwardly to separate electrode C from the workpiece (not shown). Pressure on the fluid in bore 16 below first piston 38 is then released to permit the above described cycle to be repeated. The valving for control of flow of fluids under pressure to and from body 10 is conventional, and is accordingly not shown.

The housing assembly A shown in FIG. 2, together with movable electrode C, may be used as a part of a second form of the invention, which is illustrated in FIG. 5.

In the second form of the invention a conventional elongate water-cooled electrode E is provided that includes a rear portion 100 connected to the conductor 94. The electrode E is provided with a tip 102. A two-piece clamp 104 which is adjustably held together by bolts 106 or other fastening means, removably grips electrode portion 100 and insulating material 32 (FIG. 2) to support the housing assembly A and electrode E in fixed relationship.

When metallic workpieces (not shown) are disposed between tip 102 and electrode C, they are spot welded together in the same manner as described in conjunction with the first form of the device shown in FIG. 2. To prevent entrapment of air in bore 16 as first piston 38 moves towards cap B, a transverse passage 37 is formed in housing 10 through which such air can escape to the ambient atmosphere. Passage 37 is at all times in communication with bore 16.

In electric welding operations, particularly where the electrodes of the device employed are water-cooled, it is necessary to removably support a number of conduits G in circumferentially spaced, longitudinally extending positions on the exterior surface of a cable H, in the manner illustrated in FIG. 4. To so hold the conduits G, an arcuate member 120 is provided, the interior surface 122 of which is substantially of the same radius of curvature as that of the exterior surface of cable H.

A number of circumferentially spaced recesses 124 are formed in member 120 that extend away from surface 122, and each of these recesses is adapted to hold a particular one of the conduits G. It will be apparent that the size of recesses 124 will not necessarily be uniform, but vary in accordance with the transverse cross section of the particular conduit G to be disposed therein.

The members 120 are longitudinally spaced along the cable H to support the conduits G therefrom, with each of the members being removably held in position on the cable by a conventional, longitudinally adjustable clamp J, such as an automotive hose clamp, or the like. If desired, the hose clamp may be dispensed with and a curved resilient spring 126 embedded in the member 120, which spring at all times tends to maintain the member in gripping contact with the cable H and support the conduits G in circumferentially spaced, longitudinally extending positions thereon.

Although the present invention is fully capable of achieving the objects and providing the advantages hereinbefore mentioned, it is to be understood that it is merely illustrative of the presently preferred embodiments thereof and we do not mean to be limited to the details of construction herein shown and described, other than as defined in the appended claim.

What is claimed is:

1. In a welding apparatus of the type that includes an elongate metallic housing having a first closed end and a second apertured end; a first metallic piston freely slidable in a longitudinal bore defined in said housing; a metallic rod connected to said piston, which rod slidably engages said second apertured end and extends forwardly therethrough; a first electrode mounted on the forward end of said rod and disposed exteriorly of said housing; a second electrode positioned forwardly of said housing and so spaced from said first electrode that a plurality of abutting workpieces can be disposed between said electrodes; first means for supporting said second electrode in a fixed relationship to said housing and electrically insulated therefrom; an electric circuit connected to said housing and second electrode; a plurality of circumferentially spaced, longitudinally extending fingers formed from a resilient metallic material that extend rearwardly from said first piston in said bore and which are at all times in slidable contact with said housing, the improvement for permitting said apparatus to carry out a welding operation by a fluid under a minimum pressure which urges said first piston, fingers, rod, and first electrode to permit said first electrode to contact said plurality of said workpieces between said first and second electrodes, with said minimum pressure being such that said plurality of workpieces are gripped between said first and second electrodes with sufficient force as to permit said workpieces to be welded together when electrical power of a predetermined welding magnitude is supplied to said electrodes by said electric circuit, which improvement comprises:

(a) a plurality of forwardly and inwardly tapering faces defined on the free ends of said fingers;
(b) a second independently movable rigid piston slidably and sealingly supported in said bore rearwardly of said fingers, with said second piston having a first forwardly disposed tapered face that conforms to said tapering faces of said fingers; and
(c) second means for alternately discharging fluid of at least said minimum pressure into forward and rear end portions of said bore, with said fluid when discharged into said rear end portion moving said sectrode forwardly until said first electrode pressure conond piston, fingers, first piston, rod, and first electacts said plurality of workpieces disposed between said first and second electrodes, and said second piston after forward movement of said fingers has been stopped, tending to move forwardly relative to said fingers and in so doing, radially force at least the rear portions of said fingers into greater pressure contact with said housing to minimize the electrical resistance between said fingers and housing as electrical power is caused to flow through said electric circuit to weld said plurality of workpieces together, with said first means when discharging said forward portion of said bore moving said first electrode away from said second electrode to free said plurality of workpieces that have been welded together.

References Cited

UNITED STATES PATENTS

| 2,293,338 | 8/1942 | Harris | 219—89 |
| 2,952,830 | 9/1960 | Sperzel et al. | 339—273 X |

FOREIGN PATENTS

| 841,155 | 7/1960 | Great Britain. |

JOSEPH V. TRUHE, Primary Examiner

J. G. SMITH, Assistant Examiner

U.S. Cl. X.R.

339—273

UNITED STATES PATENT OFFICE
CERTIFICATE OF CORRECTION

Patent No. 3,538,294          Dated November 3, 1970

Inventor(s) Edward Dicks et al.

It is certified that error appears in the above-identified patent and that said Letters Patent are hereby corrected as shown below:

Column 4, after line 75, should read -- trode forwardly until said first electrode pressure con- --. Column 5, line 10, "first" should read -- second --; line 11, after "discharging" should read -- fluid into --.

Signed and sealed this 7th day of November 1972.

(SEAL)
Attest:

EDWARD M. FLETCHER, JR.				ROBERT GOTTSCHALK
Attesting Officer				Commissioner of Patents